Patented Jan. 3, 1933

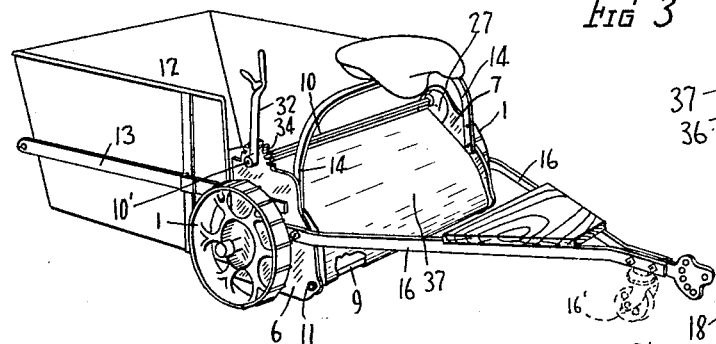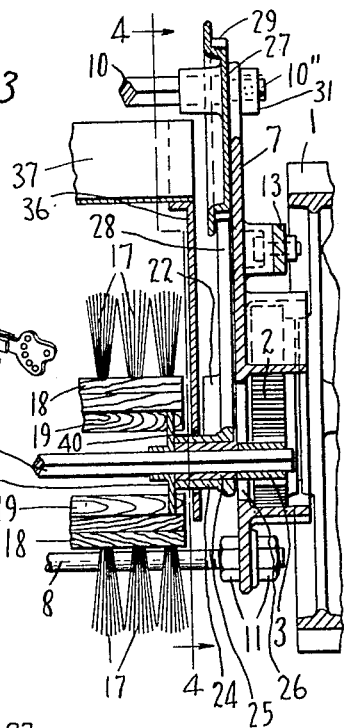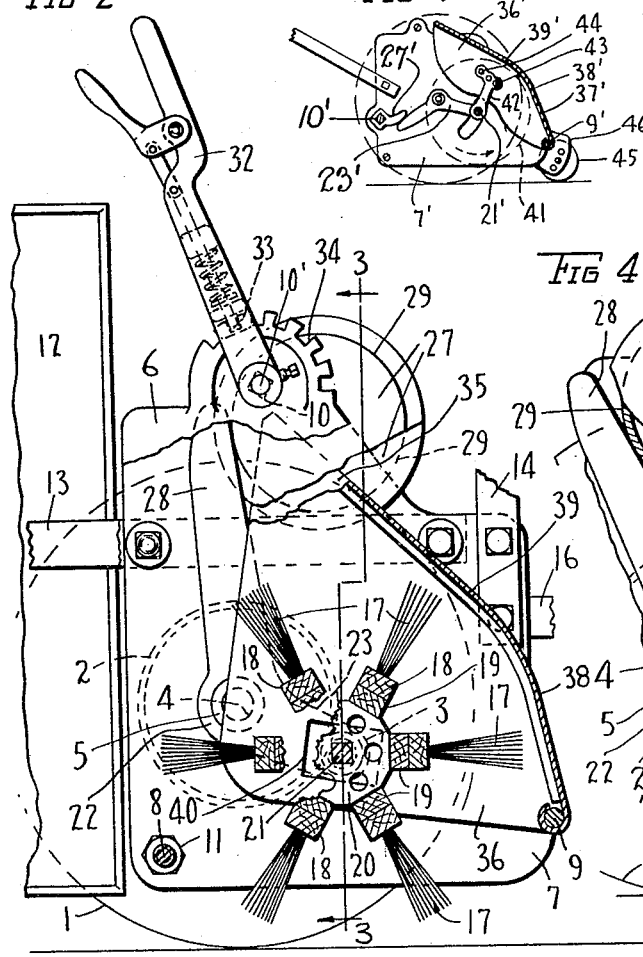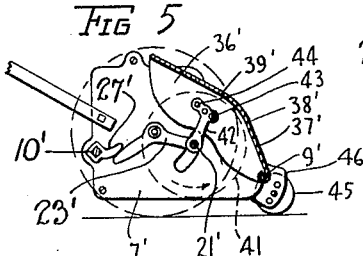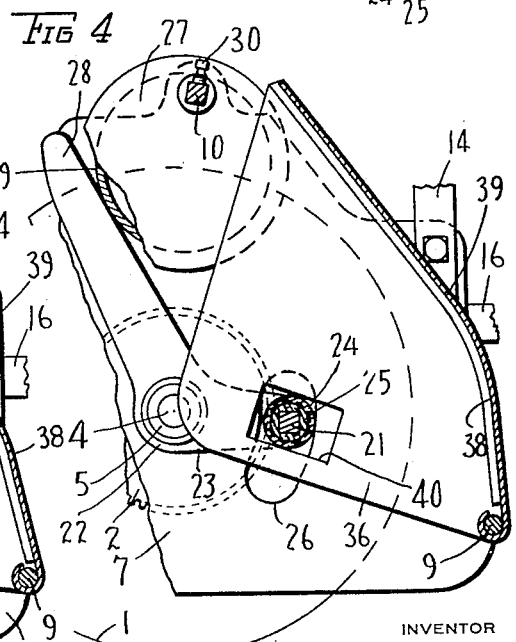

1,892,961

UNITED STATES PATENT OFFICE

EDWIN D. PARKER, OF SPRINGFIELD, OHIO, ASSIGNOR TO THE PARKER PATTERN WORKS COMPANY, OF SPRINGFIELD, OHIO, A CORPORATION OF OHIO

SWEEPING MACHINE

Application filed October 31, 1930. Serial No. 492,537.

This invention relates to improvements in sweeping machines, it more particularly relating to improvements in that class of sweeping machines having a rotary brush mounted in a hood and a collector receptacle to receive the foreign matter swept by the brush.

The sweeping machine to which my improvements are particularly adaptable is employed primarily for the purpose of cleaning lawns of cut grass, leaves and other matter, all of which is usually matter of little weight. This lack of weight is such sweepings as leaves acts to bring about a troublesome condition in the sweeping operation in that the revolving brush reel sets up circulatory air currents by which the leaves tend to follow the brushes, eventually clogging the machine.

One of the objects of my invention is to provide means whereby the effect of such air currents is offset through the medium of a peculiarly formed hood positioned in a certain relation to the brush reel, and also to provide means whereby the desired adjustment or position of the hood is maintained throughout the range of the elevation or lowering of the brush reel with respect to the ground surface.

A further and more specific object of the invention is to provide an arrangement whereby the lower portion of the hood may be maintained in fixed relation with the ground but at the same time adjusted simultaneously with the brush, when the brush is raised or lowered with respect to the ground, so as to maintain a uniform passage for the sweepings formed by the brush and the wall of the hood.

Other objects and advantages will be apparent from the following description and claims and as illustrated in the accompanying drawing.

In the accompanying drawing:

Fig. 1 is a view in perspective of a machine in which I have embodied my improved features.

Fig. 2 is a fragmentary enlarged end view with some of the minor details shown conventionally, and a portion of the view being in longitudinal section.

Fig. 3 is an enlarged fragmentary section on the line 3—3 of Fig. 2.

Fig. 4 is an enlarged fragmentary longitudinal section on the line 4—4 of Fig. 3, with some of the parts in a different working position.

Fig. 5 is a view in reduced scale of a modification, the view being taken from approximately the same point as Fig. 4, this modification being illustrated in connection with a manually propelled sweeper.

Referring to the drawing, the machine is supported on wheels 1 which also act as traction wheels to rotate the brush, there being a gear 2 connected with each of the wheels and a pinion 3 meshed with the gear and connected with the shaft of the brush. The wheels are journaled on stub axles 4 projecting outwardly from hollow bosses 5 on the outer sides of frame members 6 and 7 which are spaced apart and maintained in such relation by frame rods 8, 9 and 10, the rod 8 and 9 being provided with threads at either end on which are placed nuts 11 on either side of each frame member. The rod 10 is preferably square, the purpose of which will appear at a later point in the description.

A large sheet metal or canvas receptacle is shown at 12, supported by bars 13 bolted to the side frame members 6 and 7, while at 14 an arched support for the seat is indicated. At 16 are shown forwardly extending hitch members by which the machine as shown in Fig. 1 may be drawn from a tractor.

The brushes may be of any suitable material, but for the purpose of sweeping the lighter materials mentioned, the reel or revolving element should be constructed substantially as shown in that a comparatively small number of brushes are employed, the effect of the low number being compensated by an increased speed of rotation. In the present instance, the tufts 17 are secured in wooden brush backs 18 which are in turn mounted on wooden strips 19 which with the spiders 20 form the reel frame, the object desired in securing the brushbacks to the separate strips 19 being merely to provide a ready means of replacing worn brushes. The spiders are provided with square openings and are pressed on a square shaft 21 in suitable spaced relation, the shaft extending on either side to the vicinity of the drive gears 2. On either end of the shaft is fitted one of the pinions 3 before mentioned. At 22 is indicated the hub of a reel supporting member, one being employed on the inner side of each frame member 6 and 7, being journaled on the hollow boss 5, and from the hub 22 there extends an arm 23 ending in a hub 24 in which is rotatably journaled a cylindrical bushing 25 having a square opening to receive the reel shaft 21. The length of the arm 23 being the same as half the pitch diameter of the drive gear 2, the pinion 3 is therefore maintained in proper meshing relation with the gear 2 and rotation of the brush reel is carried on regardless of the elevation of the reel shaft. The side frame members 6 and 7 are each provided with a suitable curved slot 26 through which the extended end portions of the shaft 21 pass.

A convenient means for varying the relative height of the brushes is provided as follows: On the square rod 10 near each end and adjacent the inner sides of the frame members are eccentrics 27 having square openings, while from the hub 22 are upwardly extending arms 28. The forward edge of each of the arms 28 bears against the periphery 29 of the eccentrics 27, whereby a camming effect is produced as the rod 10 is turned, and the brushes are raised or lowered as the case may be. Each end 10' and 10'' of the rod 10 is machined so as to have a cylindrical extension which passes through bored openings in the upper portions of the side frame members. The eccentrics are secured by set screws 30 and thereby prevent inward springing of the frame members, while outward springing of the member 7 is prevented by a collar 31 at the extremity 10'. A lever 32 is provided with a latch 33 engaging any of several notches 34 in a quadrant whereby suitable elevation of the reel is secured, this lever also serving to prevent outward springing of the frame member 6.

Since the receptacle for the gathered material is placed behind the brush reel, and since the rotation of the reel is such that the sweepings are moved forwardly, provision has been made to change the direction of the sweepings toward the receptacle in the nature of a curved hood comprising end pieces 35 and 36 pivotally mounted at the lower forward corner on the rod 9, and a curved sheet metal hood member 37 attached to the forward edges of the parts 35 and 36. The sheet metal is also attached to the rod 9 by bending the metal around the rod. The peculiar formation of the hood is best seen in Fig. 2 where it will be seen that between the points indicated by the characters 38 and 39, the curvature is substantially concentrically disposed relative to the brush tips, and the distance between the brush ends and the hood is less between these points than at any other place. The object of this narrowed space is to provide a passage for the sweeping which has a narrow or restricted throat at one point so that the swept material will be slightly retarded at this point, the resulting slight friction of which causes a bending of the tufts 17, and when the outward flare of the hood from the point 39 causes a lessening of the friction, the inherent spring property of the tufts causes the material to be thrown with considerable force to the rear of the receptacle. By the narrowed space between the points 38 and 39 in the hood surface one of the objects of the invention is obtained.

Another object of the invention is accomplished by means whereby the desired relation between the brush and hood is maintained at all times regardless of the elevation of the brush reel, but without changing the position of the forward part or mouth of the hood with relation to the ground. This is afforded by interconnecting the hood proper with the arms 23, so that as the brush reel is raised or lowered to a new position, so also will the hood be raised or lowered correspondingly. One of the preferable methods of obtaining this object is shown best in Fig. 4, where the parts have been re-arranged for the purpose of clearly illustrating the invention.

The hood and parts 35 and 36 are each provided with a slot 40 near the lower edges, through which slots are passed the hubs 24 of the arms 23, the hood proper being seen to be partially supported on these hubs and partly on the rod 9. It will then be obvious that as the arms 23 are raised or lowered in unison by movements of the lever 32, the hood will also be moved, the movement being a partial rotation of the hood about the axis of the rod 9. By this arrangement and within the limits of the vertical adjustment of the reel by means of the lever 32, the distance between the brush ends and the hood at the concentric portions thereof will be substantially constant.

In Fig. 5 a modification of the invention is shown. The hood is seen at 37' and the concentric portion thereof between the points 38' and 39', while the dotted circle indicated by the character 41 shows in a conventional manner the path of the brush ends. In the arrangement as shown, one end of a link 42 is secured to each of the hood ends 36', (one only being shown). The other lower end of the link has a circular opening through which the reel shaft 21' is passed. The hood is therefore supported both on the reel shaft and on the rod 9' in the same manner as described previously. Each end of the reel shaft is rotatably mounted in the end of one arm of a bell crank lever 23', the other arm of the bell crank lever being engaged by a cam finger 27' on a rock shaft 10' which shaft has a lever connected therewith corresponding to the lever 32 whereby the reel and hood may be raised and lowered. In this view a means is also illustrated whereby the hood may be adjusted in order to provide for an increase or decrease in the space between the ends of the brushes and the concentric portion of the hood. The upper end of the link 42 is secured by a screw 43 in one of a plurality of openings 44 in the end of the link, the openings being so positioned that a line passing through the center thereof is at a considerable angle with the body of the link. Such an adjustable feature is desirable in the event of worn brushes. While these modifications have been shown in connection with the manually propelled machine shown in Fig. 5, it is to be understood that they are equally applicable to the power or horse drawn machine.

It is not desirable to so adjust the brushes that actual contact is made with any portion of the hood surface as that brings about increased wear on the brushes, but only sufficiently close so that engagement with the sweeping is made. The formation and position of the hood has some beneficial effects in guiding and deflecting the air currents so that light material does not have such a pronounced tendency to follow the brushes, while the throwing effect of the elastic tufts further assures that the sweepings will be projected into the receptacle.

By this construction it will be seen that when the brush is raised or lowered with relation to the ground, the position of the hood will also be changed to maintain substantially the uniformity of the passage between the brush and hood but without altering the position of the mouth of the passage with relation to the ground. In this connection it should be explained that when the machine is hitched to a tractor through the members 16, the desired level will be maintained by the hitch devices, but in the event the machine is drawn by horse power a caster wheel 16' attached to the members 16 will be employed to maintain this level, and for the manually propelled machine of Fig. 5 a gauge wheel 45 will be placed at either side of the machine, these gauge wheels being adjustably mounted on suitable supports 46 on the side frame members.

Having described my invention, I claim:

1. In a machine of the character described, a main frame, carrying wheels therefor, a rotary sweeper mounted in said frame and rotating in a direction opposite to said wheels, a hood partly surrounding the periphery of said sweeper and spaced therefrom, the lower forward edge of which is pivotally connected with said frame at a point near the ground forward of said sweeper to coact therewith to discharge the sweepings rearwardly of the sweeper, a lever, means operated by said lever for raising and lowering said sweeper with relation to the frame, and means also operated by said lever for simultaneously adjusting the position of the hood with relation to the frame without altering the location of the lower edge of the hood with respect to the frame.

2. In a machine of the character described, a main frame, carrying wheels therefor, a rotary sweeper mounted in said frame and rotating in a direction opposite to said wheels, a hood carried by said frame and partly surrounding said sweeper and spaced therefrom, the lower forward edge of which is normally at a fixed height with relation to the frame and located near the ground line forward of and in proximity to said sweeper to cause the hood to coact with said sweeper to discharge the sweepings rearwardly, a manually operated device, and means operated by said device for raising and lowering said sweeper with relation to the frame and for simultaneously adjusting the position of the hood to maintain a substantially uniform distance between said sweeper and said hood but without altering the position of the lower edge thereof with relation to the frame.

3. In a machine of the character described, a main frame, carrying wheels for said frame, a rotary sweeper geared to said wheels so as to rotate in a direction opposite thereto, a hood partly surrounding the periphery of said sweeper and spaced therefrom, a hinged connection between the lower forward portion of said hood and said frame at a point near the ground line and forward of and in proximity to said sweeper whereby said hood coacts with said sweeper to discharge the sweepings rearwardly, a manually operated device, connections operated thereby for swinging said sweeper about the axis of said carrying wheels to raise and lower the sweeper with relation to the ground, and connections with said device for simultaneously swinging said hood about its hinge.

4. In a machine of the character described, a main frame, carrying wheels for said frame, a rotary sweeper geared to said wheels so as to rotate in a direction opposite thereto, a hood partly surrounding the periphery of said sweeper and spaced therefrom, a hinged connection between the lower forward portion of said hood and said frame at a point near the ground line and forward of and in proximity to said sweeper whereby said hood coacts with said sweeper to discharge the sweepings rearwardly, a manually operated device, connections operated thereby for swinging said sweeper about the axis of said carrying wheels to raise and lower the sweeper with relation to the ground, connections with said device for simultaneously swinging said hood about its hinge, and means for adjusting the sweeper and hood with relation to each other to vary the size of the space therebetween.

In testimony whereof, I have hereunto set my hand this 30th day of October 1930.

EDWIN D. PARKER.